United States Patent [19]

Amendola

[11] Patent Number: 5,948,558
[45] Date of Patent: Sep. 7, 1999

[54] HIGH ENERGY DENSITY BORIDE BATTERIES

[75] Inventor: Steven Amendola, Ocean, N.J.

[73] Assignee: National Patent Development Corporation, New York, N.Y.

[21] Appl. No.: 08/829,497

[22] Filed: Mar. 27, 1997

[51] Int. Cl.[6] .................................................. H01M 4/58
[52] U.S. Cl. .......................... 429/50; 429/101; 429/218.1
[58] Field of Search .............................. 429/27, 50, 101, 429/199, 218, 218.1; 423/297, 298

Primary Examiner—Stephen Kalafut
Attorney, Agent, or Firm—Fish & Richardson P.C.

[57] ABSTRACT

Borides generally can produce a cell with a high energy density. High power densities are also achievable using borides that are reasonably good conductors of electricity. High density is important to achieve high energy density. Another important factor is lower molecular weight per available electron. The borides generally provide a favorable balance of these factors compared to a number of other materials, such as lithium or zinc. Individual borides have other important characteristics. Titanium diboride is safe.

36 Claims, 1 Drawing Sheet

HIGH ENERGY DENSITY BORIDE BATTERIES

FIELD OF THE INVENTION

This invention is in the general field of electrochemical conversion using cells, particularly high energy density batteries.

BACKGROUND OF THE INVENTION

Many devices that require electricity from a battery are limited in usefulness by the battery's lifetime. Both weight and size (in other words, energy density) can be limiting factors on battery life, particularly for small devices. In particular hearing aids and many other devices would be enhanced by increasing the battery's energy density. For example, many devices could be further miniaturized if a smaller battery that gave reasonable energy density were available.

Accordingly, there is a general need to generate as much electrical energy as possible from a battery having a limited volume.

SUMMARY OF THE INVENTION

I have discovered that the use of certain borides can produce a high energy density cell. High power densities are also achievable, for example, by using borides that are reasonably good conductors of electricity.

Accordingly, one aspect of the invention generally features an electrochemical storage medium which includes at least one reduced boron-containing compound. The stored energy is released by reactions which oxidize that reduced boron-containing compound to generate an electric current and an oxidized boron-containing compound.

Typically, the reduced boron-containing compounds is a boride (e.g. titanium boride, vanadium boride, or aluminum boride). The storage medium may contain elemental boron by itself of in addition to the boride. Conductive borides may be used to enhance the overall conductivity and therefore the deliverable current. Mixtures of the borides are also contemplated to achieve desired combinations of energy density and conductivity, depending on the application. For example, a low conductivity boride may be mixed with a higher conductivity boride to achieve a desired energy density and conductivity.

Borates or polyborates may also be used as the reduced boron-containing compound. Boron halides or boron oxyhalides may also be used. See generally, Table 1, below. The oxidized boron-containing compound will contain a combination of corresponding metal oxides, halides and oxyhalides.

Typically the storage medium is an aqueous, but the invention may also be used in non aqueous systems. Another way to enhance conductivity and thereby increase current is to use a conductive electrolyte. Conductivity enhancers, such as borohydrides or metallic borides, may also be added to the medium to both enhance conductivity and to contribute, to some extent, to electrical output. Alternatively, inert conductivity enhancers, such as graphite or other conductive carbon formulations may be used.

The electrochemical reaction is improved by alkaline pH, so the storage medium preferably has a pH above 8.5, and most preferably it has a pH above 11.0. Typically, an alkali metal hydroxide is added to the storage medium to provide conductivity as well as to control pH.

The storage medium can be used as part of a battery. The battery's cathode is in electrical contact with the storage medium and preferably it includes a material that is oxidized by contact with molecular oxygen ($O_2$), e.g ambient air or exogenously supplied oxygen.

The battery is used to generate a current by contacting a load to the battery.

One specific, non-limiting embodiment of the invention uses titanium diboride ($TiB_2$) as the anode of a battery that includes an air breathing medium for the cathode. As an example of the energy density theoretically achievable, titanium diboride with a density of 4.6 gm/cc has a theoretical energy density of over 30 Watt.hrs/cc.

High (mass) density is important to achieve high energy density. Another important factor is lower weight per available mole of electrons. The borides generally provide a favorable balance of these factors compared to a number of other materials, such as lithium or zinc.

Moreover, individual borides have other important characteristics. Titanium diboride is safe and environmentally acceptable—the final products of titanium boride discharge in a basic medium are essentially borax and titanium dioxide, both of which have a relatively low environmental impact. Even the staring materials, the borides themselves, are some what refractory and also relatively benign environmentally. Other borides, such as vanadium boride with a high density of 5.1 g/mole, may be used.

DESCRIPTION OF THE PREFERRED EMBODIMENTS

Figure 1:
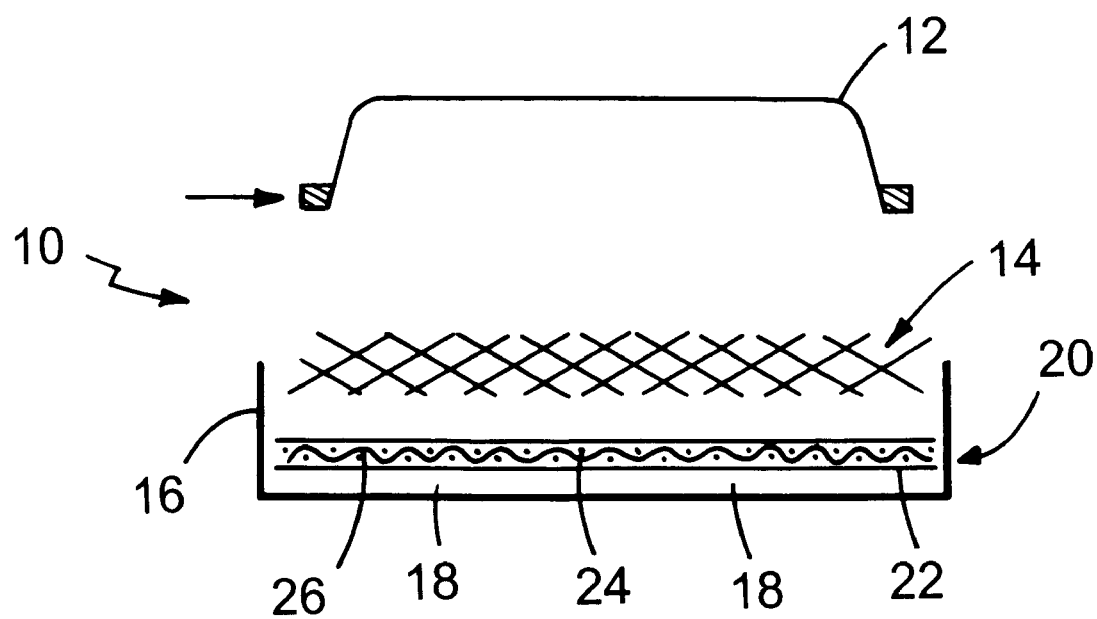
FIG. 1 is a diagrammatic view, in section, of a single use battery according to the invention.

Boride-containing anode materials provide high energy. When combined in a battery, e.g., with an air breathing electrode as the cathode, high energy density can be achieved. Other suitable oxidizers may also be utilized as a cathode in a battery that has a boride-containing cathode.

Using titanium diboride as an example, the half reactions taking place in the battery are as follows:

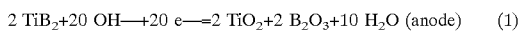

$$2\ TiB_2 + 20\ OH^- + 20\ e^- = 2\ TiO_2 + 2\ B_2O_3 + 10\ H_2O \text{ (anode)} \quad (1)$$

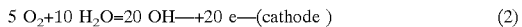

$$5\ O_2 + 10\ H_2O = 20\ OH^- + 20\ e^- \text{ (cathode)} \quad (2)$$

These two reactions result in the net reaction of:

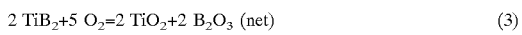

$$2\ TiB_2 + 5\ O_2 = 2\ TiO_2 + 2\ B_2O_3 \text{ (net)} \quad (3)$$

While not predicting 100% efficiency, it should be noted that the amount of energy (known as ΔG) theoretically available from reaction (3)—over 4,000 kJ per 2 moles of titanium diboride (about 139.4 grams)—is very high, more than 28 Megajoules per kilogram and more than 140 megajoules per liter.

The chemistry of the boride compounds is complex. There are many non-stoichiometric compounds of boron with the elements. For example, while equations (1) and (3) use $TiB_2$, the boride can be any boride or mixture of borides, including elemental boron. The anode may also include other compounds which would enhance any of the performance parameters of the battery, as desired.

Examples of other borides that are suitable for use in the battery generally fall into the following classes of compounds:

A. Alkali metal borides: Group Ia (group 1) borides;

B. Alkaline metal borides: Group IIa (group 2) borides;

C. Group IIIa (Group 11) borides;

D. Group IVa (Group 12) borides;

E. Transition metal borides including groups 1b to 8b (groups 3 to 10);

F. Lanthanide and actinide group borides

More specifically the compounds include those listed below.

TABLE 1

Borides

Lithium borides; Beryllium boride; Boron; Boron carbides; Boron nitrides; Sodium borides; Magnesium borides; Aluminum borides; Silicon borides; phosphorus borides; Potassium borides; Calcium borides; Scandium borides; Titanium borides; Vanadium borides; Chromium borides; Manganese borides; Iron borides; Cobalt borides; Nickel borides; Copper borides; Gallium borides; Arsenic Borides; Rubidium borides; Strontium borides; yttrium borides; zirconium borides; niobium borides; molybdenum borides; technetium borides; ruthenium borides; rhodium borides; palladium borides; silver borides; cesium borides; barium borides; lanthanum borides; cerium borides; praseodymium borides; neodymium borides; promethium borides; samarium borides; europium borides; gadolinium borides; terbium borides; dysprosium borides; holmium borides; erbium borides; thulium borides; ytterbium borides; lutetium borides; hafnium borides; tantalum borides; tungsten borides; rhenium borides; osmium borides; iridium borides; platinum borides; thorium borides; uranium borides; plutonium borides.

The existence of useful non stoichiometric boron compounds means that the ratio of the elements represented as $E_xB_y$ will vary considerably without deviating from the teachings of this patent. Elemental boron as well as the other element (E) may be added as a components of the anode.

For borides that react with water, the system used is non-aqueous system or it is stored in a mode which prevents activation until the electrolyte is allowed to come into contact with the boride. Additionally, as a general rule for applying the above list, the energy density will tend to decrease going down and to the right-hand side of the periodic chart. Reactivity with water generally tends to occur only with the first two columns on the left of the chart. Higher electrically conductivities tend to be found in the center of the chart, with many of the transition metal borides exhibiting high or even metallic conductivities. It is the very wide range of properties of these compounds that gives the wide range of diversity of the finished batteries.

A wide array of electrolytes and oxidizers may be incorporated in the battery to complement the boride compounds that can be used. Examples are: water/sodium hydroxide systems; alkali metal hydroxides such as lithium hydroxide; sodium hydroxide; potassium hydroxide; rubidium hydroxide; cesium hydroxide; tetraorganoammonium hydroxides of the general formula $R_4NOH$—where the R groups can be the same or different on the same molecule—such as tetramethylammonium hydroxide; and glycerin/water/boric acid or borates.

The above described anode materials or combination of materials may be used in a battery whose cathode is a suitable oxidizing agent. Among the suitable cathode materials are: cathodes which use molecular oxygen ($O_2$) such as direct air breathing electrodes; cathodes which include a oxidizing agent, e.g., any material that provides oxygen such as ferrates MnO2, CrO3, KMnO4, NiOOH, peroxides, perhalates, perchlorate, chlorates, bromates, perbromates, iodates, periodates, hypochlorites chlorites, high valence metal halides, etc. In general one can use the halates of the formula $HAL_xOy_n$ where the oxidation state of the halogen (HAL) is from +1 to +7 and the number of oxygen atoms is such that the charge of the anion is usually −1 so the value of n is usually 1. Other materials may be based on halogens such as fluorine or high valency metal fluorides or chlorides materials such as $NiF_3$ or interhalogens such as $IF_5$ or $ClF_3$, etc. Non aqueous systems may be used for halogen-based materials that are water sensitive. For example, such systems may use organic solvents that are conductive (or can be made conductive by the addition of enhancers).

An important feature of this chemistry is its ability to operate at ambient or moderate temperatures, avoiding the use of molten salts and allowing the batteries to be used in many applications such as consumer products. By establishing a desired reaction rate, one can make the current output suitable for the given application. This rate is determined by the combination of factors previously mentioned, the key ones being electrolyte composition, conductivity of the entire cell, the anode and cathode materials.

For example, highly alkaline aqueous systems (pH over 9.0 and preferably over 11.0) will provide a more rapid reaction, and, all other things being equal, if ionic species in the electrolyte are a factor limiting conductivity, higher pH will also increase conductivity and current. Those skilled in the art will also understand that a variety of current enhancers can be used as desired in a given application. For example, inert (non-participatory) materials such as graphite or more ionic electrolytes may be used. In some applications, it may be desirable to use a current enhancer that itself participates in oxidation, thus contributing, at least to some extent, to the current density as well as conductivity. In those cases, e.g., metallic borides (e.g., $NiB_2$, FeB, or other borides) may be added.

Those skilled in the art will understand, therefore, that the invention may be adapted to many different battery applications with differing volume limitations and current requirements.

One preferred way to provide the boride compound in a battery is to make a hydroxide (NaOH, LiOH) slurry (paste) that contacts the anode. The cathode may be an air breathing electrode. For example, the cathode may be a air-permeable plastic in contact with felt comprising a metal powder, such as nickel, platinum, or silver. Air oxidizes the metal powder, in a reaction that can be coupled with the boride-containing anode storage medium (e.g., the slurry described above). Electrosynthesis Corp. of Lancaster, N.Y. sells air breathing cathodes that are suitable for some applications.

In FIG. 1, a button battery 10 is the type of battery which is used in a hearing aid or other electronic device. Battery 10 includes a metal cap 12 providing the negative terminal, which covers a $TiB_2$/KOH paste 14 contained in a metal cup 16. The bottom of cup 16 includes very small air breathing holes 18 which allow air to reach air breathing cathode 20. Cathode 20 includes an air permeable plastic base 22 covered by a felt layer 24. Felt layer 24 is impregnated with a metal powder (e.g., Ag, Ni, Pt, etc.) that reacts with $O_2$ in the air. A metal (e.g. Ni) mesh 26 is also included in the felt layer to improve conductivity.

Alternative cathodes include electrodes based on $MnO_2$ as a redox material.

What is claimed is:

1. A battery having an anode and a cathode in electrical contact, the anode comprising an electrochemical storage medium, said electrochemical storage medium comprising at least one reduced composition which is oxidizable to an oxidized composition in a reaction which yields an electric current, said reduced composition comprising boron or a boron-containing compound, said oxidized composition comprising a boron-containing compound in which the boron is oxidized relative to its oxidation state in said reduced composition.

2. A battery having an anode and a cathode in electrical contact, the anode comprising an electrochemical storage medium, said storage medium comprising at least one reduced composition which is capable of being oxidized to an oxidized composition in a reaction which yields an electric current, said reduced composition comprising boron or a boron-containing compound, said cathode comprising a material that is oxidized by contact with oxygen.

3. A battery having an anode and a cathode in electrical contact, the anode comprising an electrochemical storage medium, said storage medium comprising at least one reduced composition which is oxidizable to an oxidized composition in a reaction which yields an electric current, said reduced composition comprising boron or a boron-containing compound, said cathode comprising a metal-halide in which the metal can be reduced to a lower valence.

4. A battery having an anode and a cathode in electrical contact, the anode comprising an electrochemical storage medium, said storage medium comprising at least one reduced composition which is oxidizable to an oxidized composition in a reaction which yields an electric current, said reduced composition comprising boron or a boron-containing compound, said cathode comprising an interhalogen.

5. The battery of any one of claims 1, 2, 3, or 4 in which the reduced composition comprises a boride.

6. The battery of any one of claims 1, 2, 3, or 4 in which the reduced composition contains elemental boron.

7. The battery of claim 2 in which the boride is conductive.

8. The battery of any one of claims 1, 2, 3, or 4 in which the oxidized composition comprises a borate or polyborate.

9. The battery of any one of claims 1, 2, 3, or 4 in which the storage medium is in an aqueous system.

10. The battery of any one of claims 1, 2, 3, or 4 in which the storage medium is in a non aqueous medium.

11. The battery of any one of claims 1, 2, 3, or 4 in which the oxidized composition comprises a boron halide or a boron oxyhalide.

12. The battery of any one of claims 1, 2, 3, or 4 comprising a conductive electrolyte.

13. The battery of any one of claims 1, 2, 3, or 4 in which the storage medium further comprises a borohydride in addition to said boron-containing compound.

14. The battery of any one of claims 1, 2, 3, or 4 in which the storage medium further comprises a metallic boride compound.

15. The battery of claim 11 in which the metallic boride compound is FeB or $NiB_2$.

16. The battery of any one of claims 1, 2, 3, or 4 in which the storage medium further comprises a conductivity enhancer which itself is oxidized to provide addition current during oxidation of said reduced composition.

17. The battery of any one of claims 1, 2, 3, or 4 in which the storage medium further comprises graphite.

18. The battery of any one of claims 1, 2, 3, or 4 in which the storage medium further comprises an inert conductivity enhancer.

19. The battery of one of claims 1, 2, 3, or 4 in which the storage medium comprises titanium diboride.

20. The battery of any one of claims 1, 2, 3, or 4 in which the storage medium comprises vanadium diboride.

21. The battery of any one of claims 1, 2, 3, or 4 in the storage medium comprises an aluminum boride.

22. The battery of any one of claims 1, 2, 3, or 4 in which the storage medium comprises a compound selected from the group listed in table 1.

23. The battery of any one of claims 1, 2, 3, or 4 in which the oxidized composition comprises a metal oxide and a borate.

24. The battery of any one of claims 1, 2, 3, or 4 in which the oxidized composition contains a combination of corresponding metal oxides, halides and oxyhalides.

25. The battery of any one of claims 1, 2, 3, or 4 in which the storage medium has a Ph above 8.5.

26. The battery of any one of claims 1, 2, 3, or 4 in which the storage medium has a pH above 11.0.

27. A battery according to any one of claims 1, 2, 3, or 4 in which the reduced composition is a material that is capable of being oxidized by contact with oxygen.

28. A battery according to claim 27 in which the reduced composition is oxidized by exposure to molecular oxygen.

29. A battery according to claim 8 in which the reduced composition is oxidized by exposure to air.

30. A battery according to any one of claims 1, 2, 3, or 4 in which the cathode comprises an oxygen-containing compound.

31. A battery according to claim 30 in which the oxidizing compound is selected from ferrates, $MnO_2$, $CrO_3$, $KMnO_4$, $LiCoO_2$, NiOOH, peroxides, perhalates, perchlorate, chlorates, bromates, perbromates, iodates, periodates, hypochlorites chlorites.

32. A battery according to any one of claims 1, 2, 3, or 4 in which the cathode comprises a non-oxygen containing oxidizing compound.

33. A battery according to claim 32 in which the non-oxygen containing compound comprises a metal which can be reduced to a lower valence.

34. A battery according to claim 33 in which the non-oxygen compound is a metal-halide in which the metal can be reduced to a lower valence.

35. A battery according to claim 33 in which the non-oxygen compound is an interhalogen.

36. A method of generating a current by contacting a load to the battery of any one of claims 1, 2, 3, or 4.

* * * * *

UNITED STATES PATENT AND TRADEMARK OFFICE
CERTIFICATE OF CORRECTION

PATENT NO. : 5,948,558
DATED : SEPT. 7, 1999
INVENTOR(S) : STEVEN AMENDOLA

It is certified that error appears in the above-identified patent and that said Letters Patent is hereby corrected as shown below:

In Column 2, Line 11, delete "30 Watt.hrs/cc" and insert --30 Watt'hrs/cc--.

In Column 3, Line 14, delete "phosphorus" and insert --Phosphorus--.

In Column 3, Line 19, delete the first "Borides" and insert --borides--.

In Column 5, Line 43, delete "claim 2" and insert --claim 5--.

In Column 5, Line 56, delete "1,".

In Column 6, Line 1, delete "claim 11" and insert --claim 14--.

In Column 6, Line 37, delete "claim 8" and insert --claim 28--.

Signed and Sealed this

Twenty-seventh Day of March, 2001

Attest:

NICHOLAS P. GODICI

Attesting Officer

Acting Director of the United States Patent and Trademark Office